Jan. 8, 1929.

R. M. CRAIG 1,698,219

DISPLAY APPARATUS

Filed Dec. 29, 1925

Inventor

R. M. Craig.

By Lacy Lacey, Attorneys

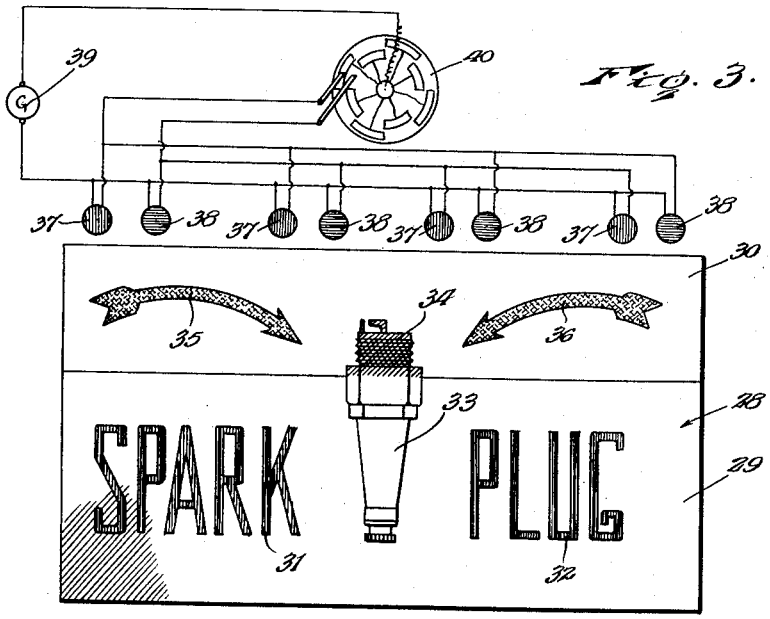
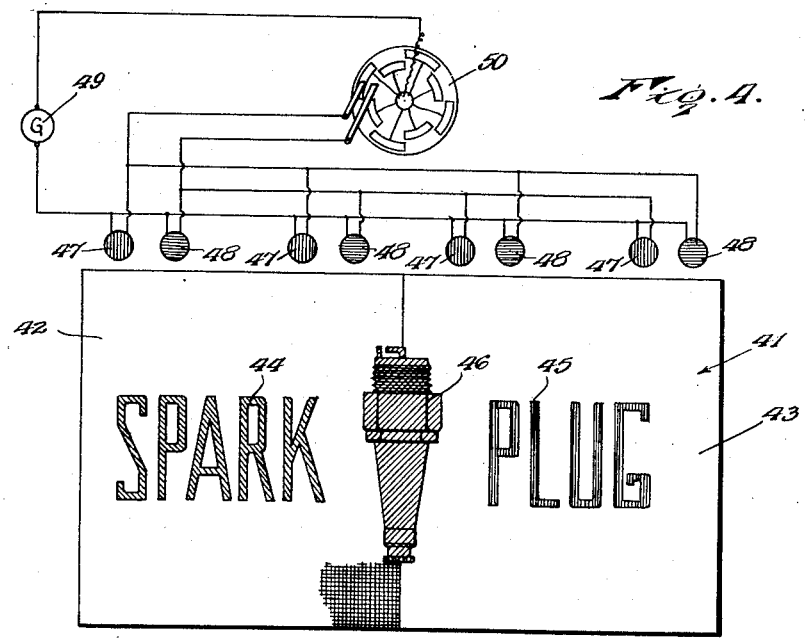

Jan. 8, 1929.
R. M. CRAIG
1,698,219
DISPLAY APPARATUS
Filed Dec. 29, 1925
4 Sheets-Sheet 3
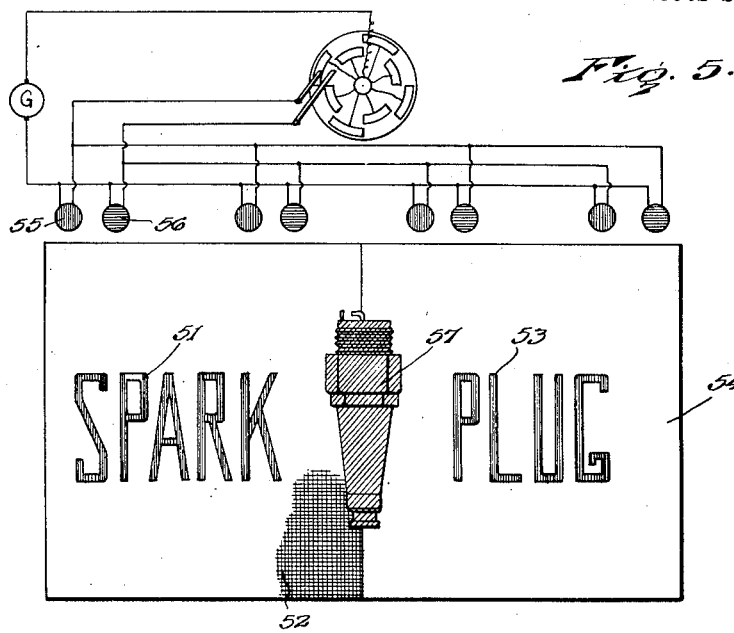
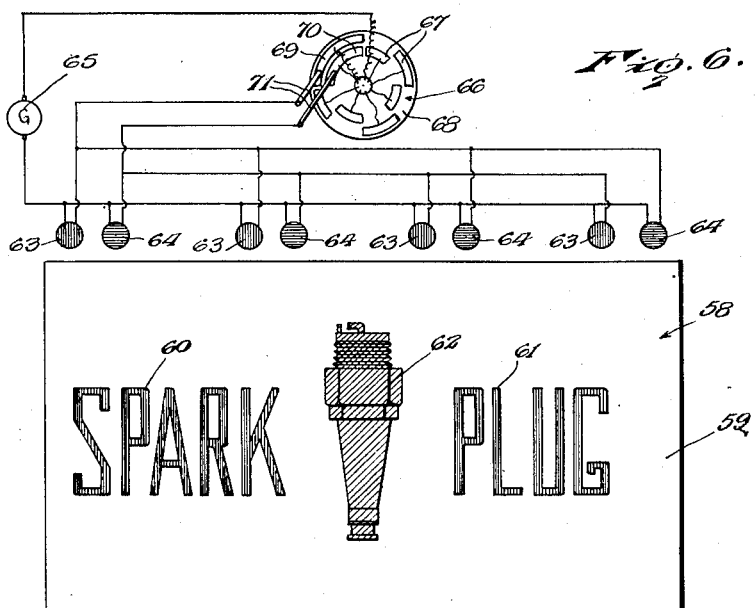
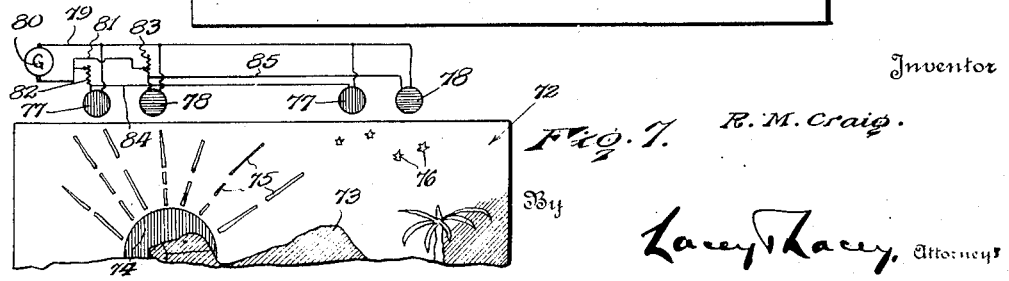
Inventor
R. M. Craig.
By Lacey & Lacey, Attorneys

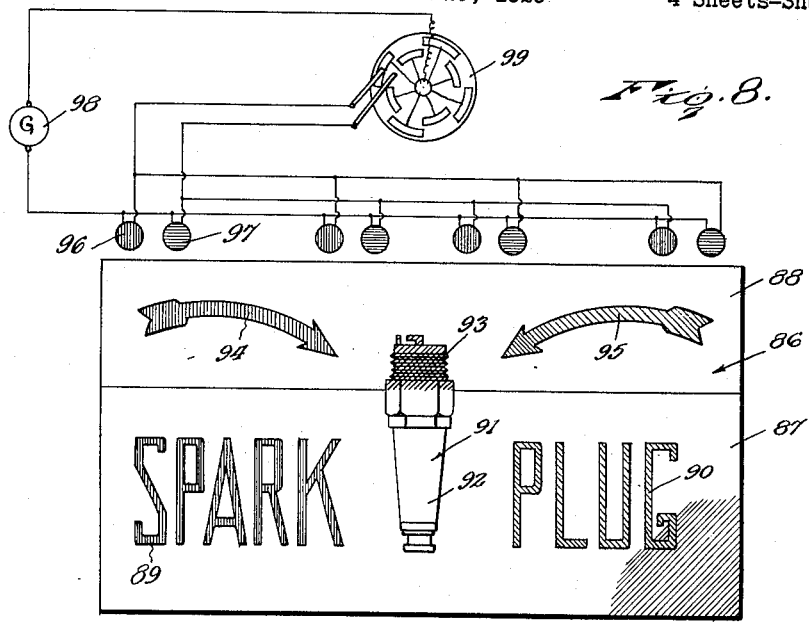
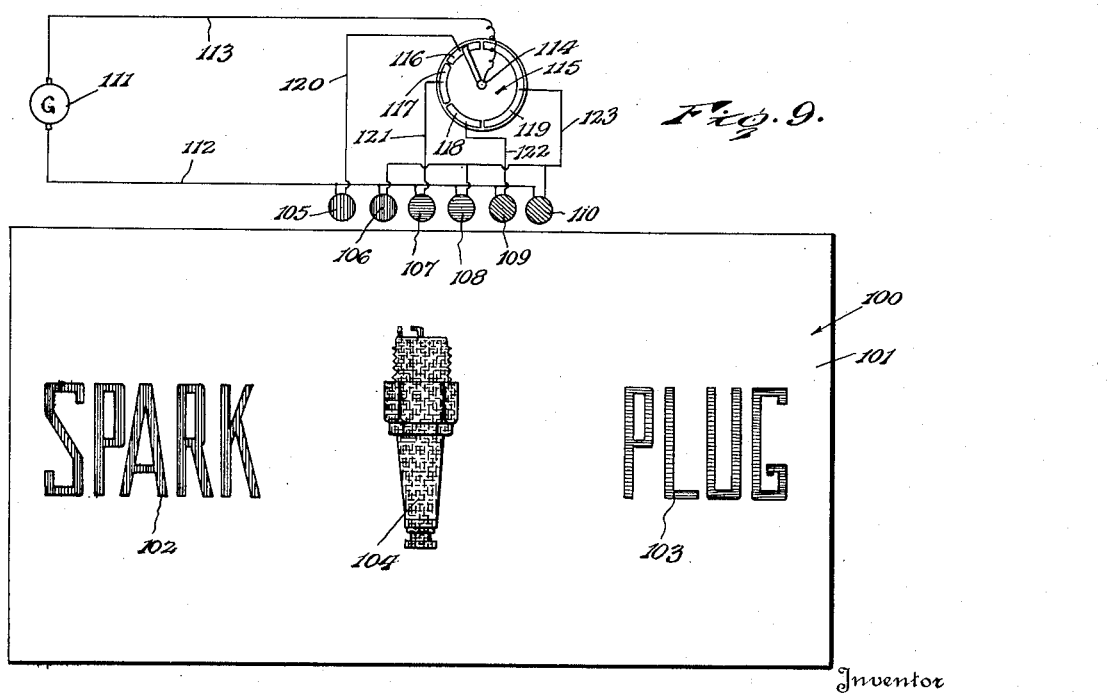

Patented Jan. 8, 1929.

1,698,219

UNITED STATES PATENT OFFICE.

RICHARD M. CRAIG, OF SAN ANTONIO, TEXAS.

DISPLAY APPARATUS.

Application filed December 29, 1925. Serial No. 78,244.

This invention relates to a novel method of and means for displaying advertising matter and the like in a manner to attract and hold the attention of the observer, the invention being based on the principles of color absorption and constituting a carrying forward of the general method disclosed in my co-pending application filed August 14, 1925, Serial No. 50,330. In the said co-pending application, the matter to be displayed is represented in one or more pigment colors upon a light or dark background, as may be found desirable, and the effect of animation or change in position or condition of the matter represented is produced by successively displaying the surface bearing said matter under light rays of different spectral colors. This method and the means for carrying out the same is not only entirely practicable, but exceptionally pleasing and attractive effects can be produced thereby. It has been found, however, that matter displayed under blue or green light cannot be displayed with the same prominence and visibility as matter displayed under a red light for example. Under some conditions, it is necessary that the sign be so located that the surface thereof which bears the matter to be displayed, must be viewed from a considerable distance and, therefore, it is one of the objects of the present invention to disclose means whereby such display surfaces may be exhibited under conditions which will permit of the displayed matter being readily discerned from a considerable distance, both in daylight and at night.

Another object of the invention is to evolve a novel method of and means for displaying advertising and other matter, represented in pigment colors, through the medium of spectral light rays of suitable colors, in a manner to present vivid and pleasing color effects to the eye, thereby attracting and holding the attention of the observer and enhancing the value of the display surface as an advertising medium.

Another important object of the invention is to provide means whereby certain matter to be displayed may be continuously presented to the vision of the observer and other matters, associated therewith, displayed at intervals, with the effect of animation or change, so as to impress upon the mind of the observer the nature of the article or the like constituting the subject matter of the advertisement, at the same time his attention is attracted and held to the sign by the changing color and motion effect.

In one embodiment of the invention there is contemplated the provision of means whereby the display surface is not only alternately illuminated with light rays of different colors to produce color and animation effects, but may be, for a period of time, illuminated simultaneously by different colored light rays which, being of a complementary nature, produce white light, thereby vividly displaying the entire display surface, as it would be viewed in daylight, but with more concentrated illumination and brilliancy.

Another object of the invention is to provide a display or advertising medium of the character referred to above which will operate effectively even in the presence of stray light rays from adjacent signs or other sources of light.

Another object of the invention is to provide for the use of non-complementary colored pigments where this is desirable so that greater latitude is permitted in the arrangement of the matter to be displayed.

In the accompanying drawings:

Figure 3 is a schematic view illustrating the application of the principles of the invention to a display surface having background areas of different characters and wherein more complex effects are obtained than in the applications shown in Figures 1 and 2.

Figure 4 is a view similar to Figure 3, illustrating a different arrangement of the background areas and a different method of representing the different matters to be displayed.

Figure 5 is a view similar to Figure 4, illustrating another application of the principles of the invention.

Figure 6 is a schematic view illustrating another application of the principles of the invention, wherein the entire display surface may be flooded with white light for a period of time and during another period of time may be displayed in light rays of contrasting colors.

Figure 7 is a schematic view illustrating means whereby the matter represented upon the display surface may be displayed in light rays of one color and the light rays then gradually changed to another color.

Figure 8 is a schematic view illustrating a display similar to that illustrated in Figure 3, but with a different display effect.

Figure 9 is a schematic view illustrating another application of the principles of the invention involving the use of three distinctive spectral colors in displaying the display surface.

In the description which is to follow reference will be made to pigment colors and by this term are meant colored pigments or the colors in which the images are represented on the display surface. Reference will also be made to spectral colors and by this is meant the colors of the spectrum as represented by the colored light rays. Reference will likewise be made to neutral colors and by neutral colors is meant colors which do not materially change under spectral color illumination or, in other words, those colors which display no decided color characteristics such as relate to primary colors.

Figure 1:
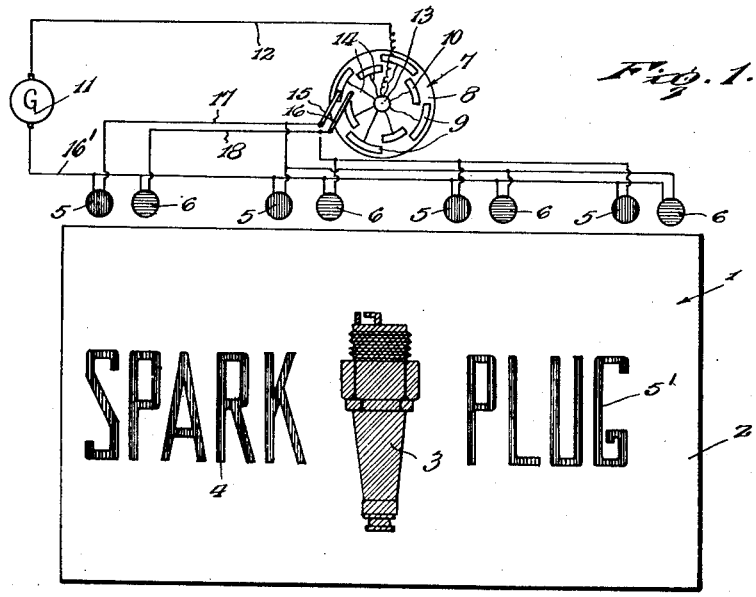
Figure 1 is a schematic view illustrating one application of the principles of the present invention, wherein one kind of background is utilized in combination with matter represented thereon in neutral color and other matter in a single primary pigment color.

Figure 1 of the drawings illustrates one application of the principles of the present invention. The numeral 1 indicates in general the display surface, which may be a sign board or any other surface upon which advertising or other matter is to be represented. In this embodiment of the invention, the display surface is painted white or some other light neutral color to provide a neutral background 2, and upon the mid-portion of the surface there is represented, in some dark neutral color or colors, an image 3 of the article to be advertised, it being understood, of course, that the representation is not limited to an article of merchandise but that any matter may be represented on this portion of the background if such matter is intended to be continuously displayed to view, and it is for this reason, as will presently be made apparent, that the matter is represented in a dark neutral color. In the particular illustration given, the representation 3 is that of a spark plug, and advertising matter relating to the particular article is represented upon the background at opposite sides of the representation 3. Thus, as an illustration, the word "Spark" indicated by the numeral 4, may be painted in red pigment upon the background at the left hand side of the representation 3, and the word "Plug", indicated by the numeral 5', may be painted likewise in red pigment, upon the background at the right hand side of the representation. This constitutes, of course, merely a simple example of the application of the principles of the invention and the matters to be displayed may be of a more complex nature, depending upon the character of the display as a whole. There are numerous light neutral colors and numerous dark neutral colors, and as an example of the use of such colors, the background 2 may be white, white lead, zinc white, or the like, and the representation 3 may be in brown, Indian red, black or the like. The invention contemplates successive illumination of the display surface by light rays of complementary colors such for example, as red and blue, and while any source of illumination may be employed, it is preferable to arrange, in proximity to the surface and in position to illuminate the same, a plurality of red electric light bulbs 5, and blue bulbs 6, the arrangement of the bulbs being such that they will be symmetrically distributed as, for example, in the manner illustrated in Figure 1. In this embodiment of the invention, it is contemplated that the two lateral halves of the display surface be successively illuminated by the complementary colors and, therefore, a suitable flashing mechanism is provided which is illustrated diagrammatically in Figure 1, and indicated in general by the numeral 7. As a suitable example of such a mechanism or device, the same may comprise a disc 8 of insulating material in which are embedded a number of contact strips 9 of arcuate form and other contact strips 10 likewise of arcuate form, the strips being positioned concentric to the axis of rotation of the disc 8 and said strips 9 and 10 being arranged in staggered relation. The numeral 11 indicates the source of current supply and the numeral 12 a conductor wire leading therefrom to, for example, the shaft 13 upon which the disc 8 is mounted, branch wires 14 extending from the shaft to the several contact strips 9 and 10. Brushes 15 and 16 are suitably mounted in juxtaposition to the disc to respectively contact the strips 9 and 10 in the rotation of the disc 8, and another conductor wire 16' is led from the other terminal of the source of current supply and connected to one terminal of each of the sockets for the light bulbs 5 and 6. A conductor wire 17 is connected to the brush 15, and branches leading therefrom, are connected to the other terminals of the sockets for the red light bulbs 5 at the left of the display surface 1, and to the other terminals of the sockets for the blue light bulbs 6 at the right of said display surface, as shown diagrammatically in Figure 1 of the drawings. A conductor wire 18 and branches therefrom are connected to the other terminals of the sockets for the blue light bulbs 6 at the left side of the display surface and to the other terminals of the sockets for the red light bulbs 5 at the right hand side of the display surface. The arrangement of the contact strips 9 and 10 is such that, for example, when the receding end of one of the contact strips 9 passes beneath the brush 15, in the rotation of the flasher disc 8, the advancing end of the next adjacent contact strip 10 will ride into electrical contact with the brush 16, due to the arrangement of the light bulbs and the manner in which they are wired in connection with the flasher device, of whatever character it may be, the red light bulbs 5 at the left hand side of the display surface and the blue light bulbs 6 at the right hand side of the display surface will be simultaneously illuminated for a period of time and, at the moment they are extinguished, the blue light bulbs 6 at the left hand side of the display surface and the red light bulbs 5 at the right hand side of the display surface will be supplied with current. Consequently, at one moment the display surface will be illuminated or displayed in red light rays at the left hand side and blue light rays at the right hand side, and at the next moment, in blue light rays at the left hand side and red light rays at the right hand side. The display matters 4 and 5', in the specific embodiment illustrated constituting the words "Spark" and "Plug" respectively, are, as previously explained, represented in red pigment color and consequently when the left hand side of the display surface is illuminated in red light rays and the right hand side thereof in blue light rays, the word "Spark" will be obliterated and the word "Plug" will appear substantially black on a substantially blue background. Similarly, when the left hand side of the display surface is illuminated by blue light rays and the right hand side by red light rays, the word "Spark" will appear substantially black against a blue background and the word "Plug" will be obliterated, but the right hand side of the surface will be illuminated in red. Due to the symmetrical arrangement of the red and blue light bulbs, in the manner illustrated in Figure 1, or an equivalent manner, and due to the blending of the complementary spectral colors red and blue, the intermediate portion of the display surface upon which the representation 3 is depicted in neutral pigment color, will appear substantially white and the said representation 3 will, therefore, be visible at all times, the neutral color in which it is represented being substantially unaffected by the spectral light rays by which the display surface is illuminated. Thus, in this application of the principles of the invention, we have the effect of a display surface ranging, in one instance, in color, from red to white to blue and, in the other instance, from blue to white to red. This color change produces a pleasing effect on the observer of the display surface and his attention is attracted and held thereto. It will be evident that in this embodiment of the invention there are present the factors of animation, illumination with color effects, and change in the matters to be displayed, so that while the spark plug representation 3 is always presented to the vision of the observer, the words "Spark" and "Plug" are caused to be successively presented to his vision, thus impressing on his mind the identity of the article which is being displayed. As previously stated the example illustrated in Figure 1 of the drawings is a simple one and is intended merely to exemplify one of the possible applications of the principles of the invention and it will be quite evident that a much more complex arrangement of matter to be displayed may be developed under the ingenuity of the designer of the display surface. As distinguished from other applications of the principles of the invention which will be presently explained, it is to be observed that in this instance the representations 4 and 5', being painted in a common pigment color upon a light neutral background, are obliterated under corresponding spectral light rays and displayed to the vision under complementary spectral light rays. It will likewise be understood that while the representations 4 and 5' have been described and illustrated as red in color, they may be of any other primary color and that the light rays delivered from the sources of illumination will be varied in color to conform with valuations in the colors of the representations 4 and 5'. As a specific example, the words "Spark" and "Plug" might be represented in green pigment color. Instead of representing the words "Spark" and "Plug" in red only, these representations might be painted or otherwise represented in a combination of red, magenta, pink, orange and yellow, all of which colors would disappear under red light illumination and would give varying color graduations under blue or green light illumination.

Figure 2:
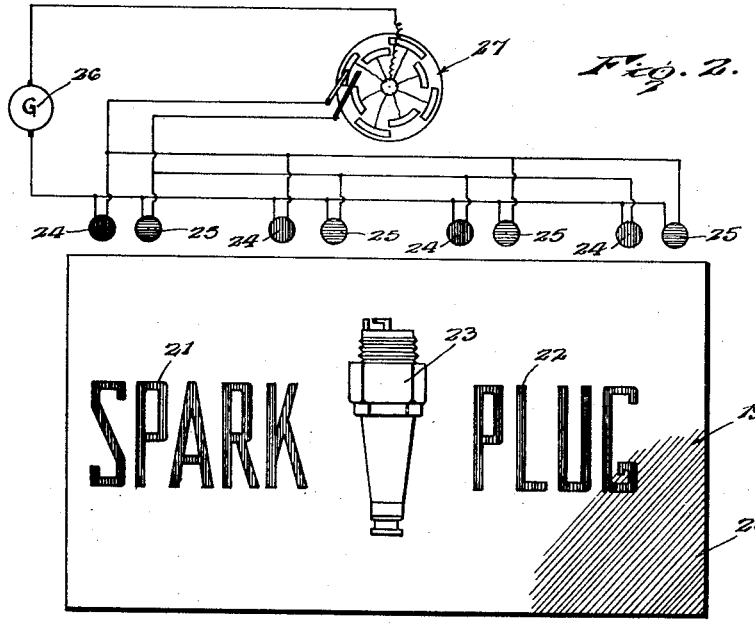
Figure 2 is a similar view illustrating another application of the principles of the invention, wherein the matter to be displayed is represented upon a background of a different character than that shown in Figure 1.

Figure 2 of the drawings represents a converse application of the principles of the invention. In this figure, the numeral 19 indicates in general a display surface to which there is applied a dark neutral pigment to provide a dark neutral background indicated by the numeral 20. Matters to be displayed, such for example as the words "Spark" and "Plug", indicated by the numerals 21 and 22 respectively, are depicted upon the background 20 in red, in the illustrated embodiment, or in some other primary color or contrasting color. As the background 20 is of a dark neutral color, the representation 23 of a spark plug, which corresponds to the representation 3 in the previously described embodiment of the invention, is in white or some other light neutral color. Red light bulbs 24, and blue light bulbs 25, are arranged in juxtaposition to the display surface in a manner to illuminate the same in the same manner as the light bulbs 5 and 6 in the previously described embodiment of the invention. Current from the source of supply 26 is supplied to the light bulbs and the supply is controlled by a flasher 27 and a system of wiring identical with that shown in Figure 1 of the drawings, therefore requiring no further description. In this application of the principles of the invention, when the left hand side of the display surface is illuminated in red and the right hand side in blue, the word "Spark" or the equivalent representation 21, will appear vividly substantially in white against a black or dark background and the representation 22 or the word "Plug" will be obliterated, and, on the other hand, when the left hand side of the display surface is illuminated in blue and the right hand side in red, the word "Spark" will be obliterated and the word "Plug" will appear vividly and substantially white against a black background. It will be evident that due to the blending of the complementary spectral light rays under which the display surface is illuminated, the intermediate portion of the display surface will be illuminated in substantially white light and, therefore, the representation 23 which is painted in a light neutral color, will stand out vividly against a dark background and will be constantly presented to the view of the observer. It will also be evident that due to the marked contrast between the dark background and the vivid substantially white color in which the representations 21 and 22 are alternately displayed, the sign disclosed in the said Figure 2 will possess exceptional value as a night sign, although, in this case, as in the embodiment of the invention previously described, the display surface possesses all that can be desired as a daylight advertising medium as all of the matters represented upon the surface are visible during daylight hours and, due to the employment of backgrounds of neutral colors, it is possible to employ opaque pigments as distinguished from transparent pigments lacking in distinctiveness. All that has been said with reference to a rearrangement of the matters to be displayed and a complex arrangement and distribution of these matters, with regard to the embodiment shown in Figure 1, applies to that shown in Figure 2. For example, the words "Spark" and "Plug" might be represented in blue or green and the background might be black, brown, dark blue, purple, dark gray, or any other suitable dark neutral color.

In the embodiment of the invention illustrated in Figures 1 and 2, the matters to be displayed are represented, in the first instance, upon a white or light neutral background and, in the latter instance, upon a dark neutral background. In the embodiment disclosed in Figure 3 of the drawings, a more complex arrangement is shown and in this figure the numeral 28 indicates in general the display surface having a dark neutral background area 29 which occupies approximately the lower half of the display surface and a white or light neutral background area 30 which occupies the upper portion of said surface, or the background areas may be reversed. In the specific instance illustrated, the word "Spark" and "Plug" are indicated respectively by the numerals 31 and 32 and are painted or otherwise represented by pigment colors upon the dark neutral background area 29. The spark plug representation, which is indicated by the numeral 33, is represented partially in a light neutral color upon the dark background area 29 and in a dark neutral color, as indicated by the numeral 34, at that portion which is located within the bounds of the light neutral background area 30. Likewise, upon the background 30 and at opposite sides of the representation 33, there are represented in a pigment color such as orange, two arrows indicated one by the numeral 35 and the other by the numeral 36, these arrows being pointed in the direction of the upper portion of the spark plug representation 33. In this embodiment of the invention, red light bulbs 37 and blue light bulbs 38 are arranged in a manner to provide for illumination of the display surface, and the supply of current to these bulbs from the source of supply, indicated by the numeral 39, is automatically controlled through the operation of a flasher which is illustrated diagrammatically in Figure 3 and indicated by the numeral 40, the sockets for the bulbs being so wired in circuit with the source of current supply and the flasher that, through the operation of the flasher, the red bulbs, for example, at one side of the display surface and the blue bulbs at the other side of the display surface will be simultaneously supplied with current and vice versa. Therefore, when the left hand side of the surface is illuminated by red light rays and the right hand side by blue light rays, the representations 32 and 35 will be obliterated and the representations 31 and 36 will be visible, the representation 31 standing out vividly substantially white on a substantially black background, and the representation 36 standing out substantially black on a background which appears substantially white by contrast. When the left hand side of the surface is illuminated by blue light rays and the right hand side by red light rays, the representations 32 and 35 will then be visible and the representations 31 and 36 are obliterated. It will be understood that due to the blending of the red and blue light rays at the opposite sides of the display surface, the intermediate portion of the display surface will be illuminated by substantially white rays, and the representation 33 will at all times be visible. It will thus be evident that, if desired, the representations 31 and 32 may be in green, and a red pigment may be employed for indicating the representations 35 and 36, in which event, when the left hand side of the display surface is illuminated by red light rays and the right hand side by blue light rays, the representations 31 and 35 will be obliterated and the representations 32 and 36 will be respectively brought out substantially white and black in color, and, on the other hand, when the left hand side of the surface is displayed under blue light rays and the right hand side under red light rays, the images 31 and 35 will appear substantially white and black in color and the images 32 and 36 will be obliterated. In fact, there are numerous color combinations which may be resorted to, employing light and dark neutral backgrounds and matters represented in pigment colors and neutral colors.

Figure 4 of the drawings illustrates an embodiment in which the display surface is indicated in general by the numeral 41 and has a neutral pigment of dark color applied to substantially one lateral half of its area so as to provide a dark neutral background 42, and a light pigment applied to the other lateral half of its area to provide a light neutral background 43. In this embodiment, the word "Spark" may be painted or otherwise represented upon the dark neutral background area 42 in green, as indicated by the numeral 44, and the word "Plug" indicated by the numeral 45, painted in red pigment upon the light neutral background 43. The representation of the article to be advertised, as for example a spark plug, and indicated by the numeral 46, will be painted or otherwise depicted upon the backgrounds 42 and 43 where they meet, in some neutral color, as for example brown. Red lights 47 and blue lights 48 are arranged in juxtaposition to the display surface so as to illuminate the same, and the current from the source of supply, indicated by the numeral 49, is supplied to the light bulbs through the medium of a flasher 50 corresponding to the flasher previously described, the circuit arrangement being such that the red lights at one side of the display surface will be supplied with current simultaneously with the blue lights at the other side of the display surface, and vice versa, in the operation of the flasher. In this embodiment, when the left hand side of the display surface is illuminated by red light and the right hand side by blue light, the representation 44 will be obliterated and the representation 45 will appear substantially black against the light background 43. On the other hand, when the left hand side of the display surface is illuminated by blue light rays and the right hand side by red light rays, the representation 44 will stand out vividly substantially white against the dark background 42 and the representation 45 will be obliterated. The representation 46, being in a neutral color, will be visible at all times.

The two embodiments of the invention last described demonstrate that single pigment colors or a number of such colors may be employed and that light and dark neutral backgrounds may be variously relatively arranged.

The embodiment illustrated in Figure 5 is identical with the embodiment shown in Figure 4, except that in this instance, the word "Spark" indicated by the numeral 51, appears in red on a dark neutral background 52, and the word "Plug" indicated by the numeral 53, appears in red on a light neutral background 54. In this embodiment, when the left hand side of the display surface is illuminated by red light rays and the right hand side by blue light rays, the word "Spark" will appear vividly white against a substantially black background and the word "Plug" will appear substantially black against a light neutral background, the spark plug representation 57 being at such time visible due to the fact that it is of a neutral color. On the other hand, when the left hand side of the display surface is illuminated by blue light rays and the right hand side by red light rays, both representations 51 and 53 will be obliterated, although the representation 57 will remain visible.

Figure 6 of the drawings represents an embodiment which is of particular value at night and in this figure the display surface is indicated in general by the numeral 58 and, in the specific instance given, has its surface painted with a light neutral pigment to provide a light background 59 of a neutral color. The words "Spark" and "Plug", indicated respectively by the numerals 60 and 61, are represented upon the background in some primary or distinctive pigment color such for example as red, and a representation 62 of a spark plug, for example, may be painted in a neutral color upon the said background, the neutral color being, of course, in contrast to the neutral color of the background so that the said representation 62 will at all times be visible against the background. Red light bulbs 63 and blue light bulbs 64 are arranged adjacent the display surface so as to illuminate the same, and the supply of current from the source of supply 65 to the said bulbs, is controlled through the medium of a flasher 66 which is of substantially the same construction as the flasher shown in Figure 1 and previously described, except that in this instance, in addition to the staggered contacts 67 which are carried by the rotating insulating disc 68, two other arcuate contact strips 69 and 70 are arranged upon the face of the disc 68 and are of uniform angular length and longer than the strips 67. In this arrangement, the staggered contact strips 67 are so arranged and wired in the circuit that as they pass beneath the brushes 71 which are in circuit with the sockets for the electric light bulbs 63 and 64, the red light bulbs at one side of the display surface and the blue light bulbs at the other side of the display surface will be simultaneously supplied with current and, vice versa, the blue light bulbs at the first mentioned side of said surface and the red light bulbs at the other side of the surface will be simultaneously supplied with current, and, due to the staggered arrangement of the contact strips, as in the first described embodiment of the invention, the display surface will be successively illuminated in a manner to display the word "Spark" and obliterate the word "Plug" when the left hand and right hand sides of the display surface are respectively illuminated by blue and red light rays and, on the other hand, obliterate the word "Spark" and display the word "Plug" when the left hand and right hand sides are respectively illuminated by red and blue light rays. However, due to the provision of the two relatively long contact strips 69 and 70, and the arrangement of these strips concentrically side by side as shown in Figure 6, there will be a period of time when all of the lights 63 and 64 will be burning, with the result that the entire display surface will be flooded with substantially white light and, therefore, all of the matter upon said surface will be as vividly and brilliantly brought to the view of the observer as seen under daylight conditions, if not more vividly and brilliantly. It will be evident, therefore, that in this embodiment of the invention, the entire display surface is flooded with white light for a period of time and then its different areas are flooded with complementary light rays which are alternated so as to attract the attention by producing the effect of animation or change in position or character of the matters to be displayed. It will likewise be evident that by utilizing the principles involved in this form of the invention great latitude is afforded the designer of the display surface and he may, as in the previously described embodiments of the invention, resort to the use of different pigment colors of a contrasting nature or single colors other than red. Likewise, the matters to be displayed may be represented upon a light or a dark background of appropriate neutral colors, or a combination of such backgrounds may be resorted to. Likewise, in this method of display, excellent and pleasing color effects are produced, due to the fact that, while the display surface is being flashed, the red, white and blue spectral colors will illuminate the surface and be reversed, alternately, as regards the position of the red and blue, to produce a pleasing color effect, and to this there is added the brilliant display of the surface when all the light bulbs are burning during the period when the entire surface is displayed. It will be evident at this point that there are three apparent changes or displays instead of two as in the previously described embodiment of the invention.

In the previously described applications of the principles of the invention, complementary spectral colors have been employed to illuminate the display surface and the light bulbs which afford the source of illumination have been flashed on and off practically instantaneously. However, I have discovered that very suitable and pleasing color effects can be obtained by resorting to the arrangement shown in Figure 7 of the drawings, in which figure the numeral 72 indicates the display surface, upon which may be represented a desert scene embracing the representation 73 of a camel; a circular disc-like area 74 which may represent the sun or moon; dart-like portions 75 radiating therefrom to represent sun rays, and dot-like areas 76 to represent stars. In the example given, the background 72 may be of a medium dark neutral color, the representation of the camel 73 may be in a light neutral color such for example as light brown, the disc-like area 74 and rays 75 may be in red, and the dot-like areas 76, representing the stars, may be left white, or they may be represented by a light green pigment. Red light bulbs 77 and blue light bulbs 78 are arranged in juxtaposition to the display surface 72 so as to illuminate the same, and a conductor wire 79 is led from the source of current supply to one terminal of the sockets for the bulbs 77 and 78, and a conductor wire 81 is led likewise from the source of current supply to rheostats 82 and 83, a conductor wire 84 establishing electrical connection between the rheostat 82 and the other terminal of the socket for each red light bulb 77, and a conductor wire 85 establishing electrical connection between the rheostat 83 and the other terminal of the socket for each blue electric light bulb 78. It will be evident that if the background 72 is of a medium dark neutral tint in the red end of the spectrum and the display surface is flooded with green light rays, the representations 74 and 75 of the sun and the rays radiating therefrom will be obliterated and the stars 76 will appear bright against the background, the representation 73 of the camel being visible but without any considerable degree of distinctiveness. On the other hand, if the display surface is flooded with red light rays, the representation 74 of the sun and that 75 of the rays will stand out brilliantly against the dark background, and the representation 73 of the camel will likewise appear more distinctly. In connection with this embodiment of the invention, it is contemplated that means be provided for simultaneously operating the rheostats so that as the light rays from the bulbs of one color are gradually dimmed, those from the bulbs of the other primary color will be gradually increased in intensity and, therefore, the retina of the eye has opportunity to adjust itself to perceive the beautiful color changes which gradually take place as the two spectral colors are gradually blended between the time the display surface is illuminated by light rays of one of the primary colors alone and the time it is illuminated completely by the light rays of the complementary color particularly where pigment tints at the red end of the spectrum are used. I have also observed, in this connection, that where blue violet bulbs are employed in conjunction with the red bulbs, even better results are obtained. While rheostats have been illustrated as a means for dimming the sources of light and increasing their intensity, it will be understood that any other well known means may be employed for this purpose and that the result may be accomplished by successively cutting out light bulbs of one color while light bulbs of another color are successively cut into circuit with the source of current supply, thus, in the first instance, gradually decreasing the intensity of the illumination and in the second instance gradually increasing the intensity of the illumination.

It will be understood, of course, that instead of painting the matters to be displayed directly on the surface of a signboard, lithographs may be employed, and, in fact, the matters may be represented in different ways upon various types of surfaces.

It will be observed that in the present invention, advantage is taken of the principle that spectral light rays of complementary colors, when blended, will produce white light, and due to the utilization of this principle, together with the matters to be displayed represented in pigment colors of a contrasting nature or single pigment colors, upon backgrounds of neutral colors, and also by the representation of the matters to be displayed by neutral pigment colors, an unlimited combination of component parts of a composite display is possible and many startling, attractive, and beautiful effects may be obtained. It is further to be noted that the various factors involved in the several applications of the principles of the invention herein set forth contribute to produce a sign which will possess high daylight value as well as night value.

It will be understood that the invention is not limited to the arrangement of two background areas of contrasting neutral colors in juxtaposition to each other, but that the display surface may be divided into any desired number of contrasting background areas of neutral colors arranged in any manner found expedient, the sources of spectral light rays being, of course, so arranged as to produce substantially the effects recited in connection with the forms of the invention shown in Figures 4 and 5 of the drawings.

It will be understood that the principles of the invention may likewise be carried out using three contrasting pigment colors and three primary or contrasting spectral colors, inasmuch as the light rays of the primary colors, when blended, will produce white light.

While a simple example of a suitable flashing device has been illustrated diagrammatically in the drawings, it will be obvious that many other electrical flashing devices may be employed, such for example as a motor flasher, a thermo-type flasher, a vacuo-type flasher, a mercury flasher, etc. Also, one fast-acting flasher may be used to successively illuminate the sign or other display surface for a period of time and then a slow-acting flasher may be operated at intervals to simultaneously energize the light sources of different spectral colors to produce white light.

In the embodiment of the invention illustrated in Figure 8 of the drawings, the numeral 86 indicates in general a display surface which is provided with a dark neutral background area 87 and a light neutral background area 88, these areas being vertically displaced with relation to each other. In the specific instance illustrated, the words "Spark" and "Plug" are indicated respectively by the numerals 89 and 90 and are painted or otherwise represented by pigment colors upon the dark neutral background area 87, the word "Spark" 89 being represented in red and the word "Plug" being represented in green. The spark plug representation is indicated by the numeral 91 and a part thereof, indicated by the numeral 92, is represented white or in a light neutral color upon the dark neutral background area 87, the other portion of the plug representation, indicated by the numeral 93, being depicted, upon the light background area 88, in a dark neutral color. Likewise, upon the light neutral background area 88, there are represented two arrows indicated one by the numeral 94 and the other by the numeral 95, the arrow 94 being represented in red and the arrow 95 being represented in green, these arrows being located at opposite sides of the portion 93 of the spark plug representation and respectively above the words "Spark" and "Plug". Likewise, the arrows are represented as pointing toward the spark plug. In this embodiment of the invention red light bulbs 96 and blue light bulbs 97 are arranged in a manner to provide for illumination of the display surface, and the supply of current to these bulbs from the source of supply indicated by the numeral 98, is automatically controlled through the operation of a flasher which is illustrated diagrammatically in Figure 8, and indicated by the numeral 99, the sockets for the bulbs being so wired in circuit with the source of current supply and the flasher that, through the operation of the flasher, the red bulbs for example, at one side of the display surface and the blue bulbs at the other side of the display surface, will be simultaneously supplied with current and vice versa. It will now be evident that when the left hand side of the display surface is flooded with red light rays and the right hand side with blue light rays, the arrow representation 94 will be obliterated as also the arrow representation 95, the word "Plug" being vividly displayed substantially white against a dark neutral background. On the other hand, when the left hand side of the display surface is flooded with blue light rays and the right hand side with red light rays, the two arrow representations 94 and 95 will be visible, appearing substantially black against a white background, and the words "Spark" and "Plug" will be obliterated. The spark plug representation 91 will, of course, be visible at all times, due to the blending of the rays from the two relatively adjacent red and blue light bulbs which are located next adjacent the said representation 91, the blending of these rays producing artificial white light.

In the embodiment of the invention shown in Figure 9 of the drawings, the numeral 100 indicates in general, a display surface having a light neutral background area 101 and the words "Spark" and "Plug" indicated respectively by the numerals 102 and 103 are painted or otherwise represented by pigment colors upon the said background at the opposite ends of the display surface, the word "Spark" appearing in magenta and the word "Plug" in cyanide blue. The numeral 104 indicates the representation of a spark plug which is painted or otherwise represented by yellow pigment upon the background 101 at a point between the words "Spark" and "Plug". In this embodiment of the invention, red light bulbs 105 and 106, blue-violet light bulbs 107 and 108, and yellow-green light bulbs 109 and 110 are arranged at the upper side of the display surface, the bulbs being grouped according to their respective colors. The numeral 111 indicates a source of current supply from one side of which there is led a conductor wire 112 which is electrically connected with one terminal of the socket for each of the bulbs 105 to 110 respectively. A conductor wire 113 leads from the other side of the source of current supply to the rotatable contact 114 of an automatic flasher indicated in general by the numeral 115, which flasher may comprise a disc having contact strips 116, 117, 118, and 119, upon its face concentric to the movable contact 114. Conductor wires 120, 121, and 122 are led from the contacts 116, 117 and 118 respectively, to the other terminals of the sockets for the bulbs 105, 107 and 109, and a conductor wire 123 is electrically connected with the contact strip 119 and with the other terminals of the bulbs 106, 108 and 110. In the operation of the flasher, the contact member 114 will at one period contact the strip 119 with the result that all of the bulbs 106, 108 and 110 will be energized so as to flood the display surface with artificial white light and thus display the words "Spark" and "Plug" as well as the representation of the spark plug. The contact 114 will next engage the contact strip 118, thereby energizing the yellow-green bulbs 109, thus flooding the surface with spectral rays of a corresponding color and obliterating the spark plug representation and the word "Plug" and bringing out the word "Spark" substantially black against a light background. The contact member 114 will next engage the contact strip 117, energizing the bulb 107 and flooding the display surface with blue-violet light rays, effecting obliteration of the word "Spark" and the word "Plug" and bringing out the plug representation substantially black, and finally the contact member 114 will engage the contact strip 116, thereby energizing the red light bulbs 105, resulting in the display surface being flooded with red light rays to obliterate the word "Spark" and the plug representation and bring out the word "Plug" substantially black against a light background.

Having thus described the invention, what I claim is:

1. Display apparatus comprising a display surface having background areas of different neutral colors bearing matters to be displayed represented in a distinctive pigment color and bearing also, in a neutral pigment color, other matter to be displayed interposed with relation to the first mentioned matters, and means for simultaneously displaying the surface in the presence of contrasting spectral light rays through the medium of sources of contrasting colored light rays arranged to illuminate the surface at opposite sides of the second mentioned matter with rays of individual colors and illuminate the last mentioned matter with rays resulting from the blending of the contrasting rays.

2. Display apparatus comprising a display surface having background areas of different neutral colors bearing matters to be displayed represented in contrasting pigment colors and bearing also, in a neutral pigment color, other matter to be displayed interposed with relation to the first mentioned matters, and means for simultaneously displaying the surface alternately in the presence of contrasting spectral light rays through the medium of sources of contrasting colored light rays arranged to illuminate the surface at opposite sides of the second mentioned matter with rays of individual colors and illuminate the last mentioned matter with rays resulting from the blending of the contrasting rays.

3. Display apparatus comprising a display surface having background areas of different neutral colors bearing matters to be displayed represented in complementary pigment colors and bearing also, in a neutral pigment color, other matter to be displayed interposed with relation to the first mentioned matters, and means for simultaneously displaying the surface in the presence of complementary colored spectral light rays each corresponding substantially to a respective one of the first mentioned complementary pigment colors and through the medium of source of contrasting colored light rays arranged to illuminate the surface at opposite sides of the second mentioned matter with rays of individual colors and illuminate the last mentioned matter with rays resulting from the blending of the contrasting rays.

4. Display apparatus comprising a display surface having a background area of a light neutral color and a background area of a dark neutral color, each area bearing a matter to be displayed represented in a distinctive pigment color, the said surface bearing also, in a neutral pigment color, another matter to be displayed interposed between the first mentioned matters and represented in part upon each of the said background areas, and means for simultaneously displaying the surface in the presence of contrasting spectral light colors through the medium of sources of contrasting colored light rays arranged to illuminate the surface at opposite sides of the second mentioned matter with rays of individual colors and illuminate the last mentioned matter with rays resulting from the blending of the contrasting rays.

5. Means for displaying the effect of change in appearance of represented matters comprising a display surface having contrasting background areas extending across the surface and vertically relatively displaced, display matters each represented upon a respective one of the areas in a distinctive pigment color, the matters upon each area being laterally displaced with respect to each other, and means for successively displaying the opposite lateral portions of the surface in light rays of contrasting spectral colors.

In testimony whereof I affix my signature.

RICHARD M. CRAIG. [L. S.]